July 2, 1935.  M. H. MARTINDELL  2,007,093
STORAGE BATTERY SEPARATOR
Filed Feb. 25, 1932
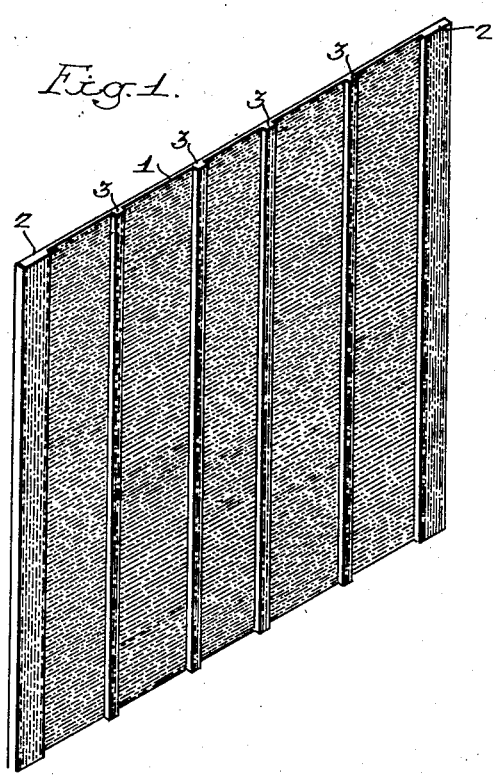
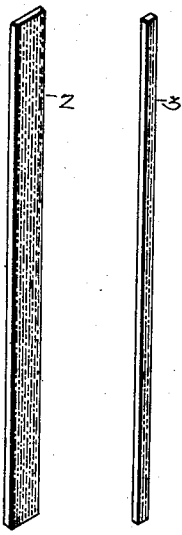
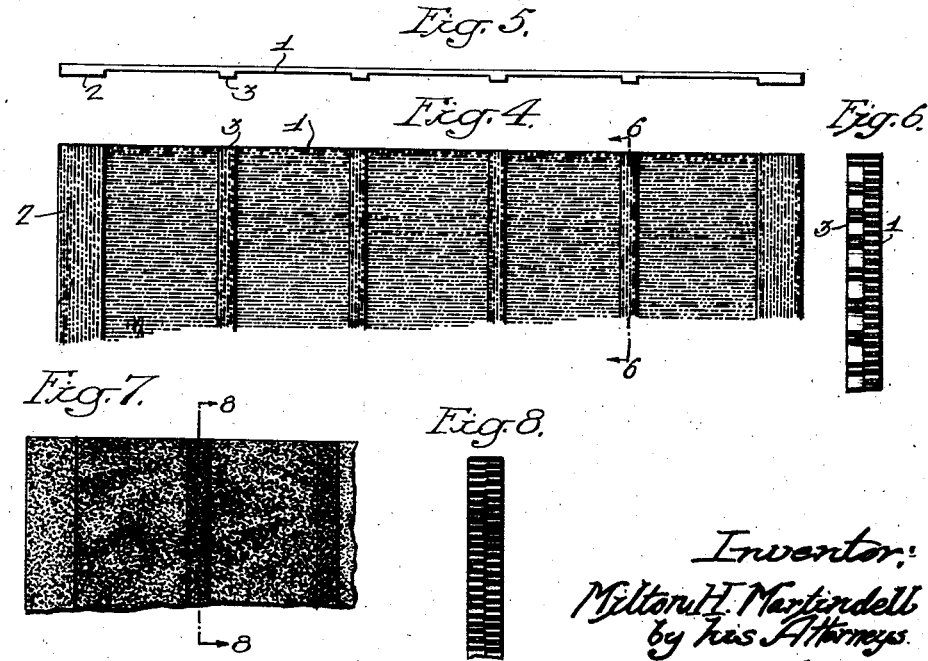
Inventor:
Milton H. Martindell
by his Attorneys
Howson & Howson Patented July 2, 1935

2,007,093

UNITED STATES PATENT OFFICE 2,007,093

STORAGE BATTERY SEPARATOR

Milton H. Martindell, Trenton, N. J., assignor to Jos. Stoker Rubber Co., Trenton, N. J., a corporation of New Jersey Application February 25, 1932, Serial No. 595,156

1 Claim. (Cl. 136—145)

One object of my invention is to make a storage battery separator of hard rubber provided with reinforcing ribs and which will be porous throughout.

A further object of the invention is to make a separator, the body of which has pores throughout which the electrolyte can freely pass and to provide the separator with reinforcing strips which are secured to the plate during the process of manufacture and which are also porous so that the entire separator is porous throughout. Heretofore in the manufacture of hard rubber separators it has been the practice to make the reinforcing strips of non-porous hard rubber, which are secured to one or both faces of the separator and located at certain distances apart. These strips stiffen the separator when in the battery and prevent it from buckling.

My invention is particularly adapted to the type of separator which is made in the manner described in the patents of T. A. Willard No. 1,243,368 and 1,243,370 of October 16, 1917, and in the manner described in the pending application filed by me on the 29th day of October, 1931, Serial No. 571,917 (now Patent No. 1,981,736, granted November 20, 1934). Both the patents and application relate to what is known in the art of storage battery manufacture as thread-rubber separators, i. e., a separator composed of substance insoluble in battery electrolyte and provided with porosity-producing plugs extending from face to face of the separators, these plugs being composed of material that is soluble in the battery electrolyte. The plugs are eaten away by the electrolyte in the battery after the battery is assembled, leaving small perforations in the separator which extend from face to face of the separator, providing for the passage of electric current between the negative and positive plates of the battery but preventing particles of the battery plate structures from passing from one to the other of the plate compartments as defined by the separator.

In the accompanying drawing:

Fig. 1 is a perspective view of a separator made in accordance with my invention;

Fig. 2 is a detached view of one of the end porous reinforcing strips;

Fig. 3 is a detached perspective view of one of the intermediate porous reinforcing strips;

Fig. 4 is a face view of the upper portion of a battery separator plate made in accordance with my invention;

Fig. 5 is a plan view;

Fig. 6 is an enlarged sectional view on the line 6—6, Fig. 4;

Fig. 7 is a view of a separator plate made in accordance with the above-mentioned patents, showing my improved porous reinforcing strips; and Fig. 8 is a sectional view on the line 8—8, Fig. 7.

The porous separator plate shown in Figs. 1 to 6, inclusive, is made in accordance with the process described in the Patent No. 1,981,736 dated November 20, 1934, noted above, and has a series of perforations made by the incorporation with the rubber before vulcanization of a twill fabric and when this fabric is eaten away by the acid of the battery, very thin slots and perforations are formed in the separator which allow for the free circulation of the electrolyte but prevent any particles of the battery plates from passing through the separator.

These rubber separators when vulcanized, are comparatively thin and must be reinforced by strips of rubber which are placed on one or both faces of the plate prior to vulcanization and when the plate is vulcanized these strips become an integral portion of the plate and stiffen the plate so as to prevent it from buckling. These strips heretofore were made of solid non-porous rubber, consequently the porous surface of the separator was considerably reduced. By my invention the entire body of the separator is made porous. This is accomplished by making the reinforcing strips porous as well as the body of the plate.

The slots in the body of the separator are made to extend horizontally while those of the ribs are made to extend vertically of the separator and to intersect the body slots. This also gives a better strengthening effect corresponding to the laying of the sheets in ply-wood where the grain of one ply or layer extends in one direction and the grain of the next layer extends at right angles thereto.

Referring to the drawing, 1 is the separator plate which is made porous in the manner set forth in my above entitled application. 2 are the end reinforcing strips and 3 are the intermediate reinforcing strips. These strips are made porous in the same manner as the plate. When the plate is partially vulcanized the strips are placed in position on one surface of the plate and then the plate with the strips thereon is completely vulcanized and is then ready to be placed in a storage battery.

When placed in a storage battery the fibrous material is eaten away by the electrolyte so that the reinforcing strips become porous as well as the body of the separator. Thus the entire separator is porous, materially increasing the porosity of the separator without materially decreasing the strength of the plate or reinforcing strips.

The perforations in the plate are small elongated slots separated by small holes, but the character of the perforations may be modified without departing from the essential features of the invention. For instance, in Figs. 7 and 8 I have illustrated a plate which is made porous in the manner set forth in the patents mentioned above and in this plate the perforations are generally circular and the perforations in the reinforcing strips are also circular.

While I have referred to the use of rubber as the body and the reinforcing ribs of the separator, equivalent material may be used without departing from the essential features of the invention.

The reinforcing ribs may be perforated in other manners than that described in the patents or application referred to above. In some instances the strip may be mechanically perforated with very small holes which will align with perforations in the body of the separator.

I claim:

A relatively thin flat storage battery separator comprising a body portion made of hard rubber and provided with perforations passing completely through said body portion substantially perpendicular to the plane thereof, said perforations including relatively narrow elongated slots extending crosswise of the separator, and a series of ribs on one face of said body portion extending vertically of the separator and provided with perforations passing completely through each rib substantially perpendicular to the plane of the separator and including relatively narrow elongated slots extending lonigtudinally of the rib and at right angles to the slots in those portions of said body portion which underlie said ribs respectively, whereby direct communication between opposite faces of the separator through said ribs is provided.

MILTON H. MARTINDELL.